US007925248B2

(12) United States Patent
Aoki et al.

(10) Patent No.: US 7,925,248 B2
(45) Date of Patent: Apr. 12, 2011

(54) PROCESSING DECISION METHOD AND MOBILE COMMUNICATION TERMINAL

(75) Inventors: Kazuo Aoki, Tokyo (JP); Tomonori Aoki, Tokyo (JP)

(73) Assignee: Softbank Mobile Corp., Tokyo (JP)

( * ) Notice: Subject to any disclaimer, the term of this patent is extended or adjusted under 35 U.S.C. 154(b) by 882 days.

(21) Appl. No.: 11/898,194

(22) Filed: Sep. 10, 2007

(65) Prior Publication Data
US 2008/0070591 A1    Mar. 20, 2008

Related U.S. Application Data

(63) Continuation of application No. PCT/JP2006/304712, filed on Mar. 10, 2006.

(30) Foreign Application Priority Data

Mar. 11, 2005    (JP) ................................. 2005-068744

(51) Int. Cl.
*H04M 3/00*    (2006.01)
*G06Q 10/00*    (2006.01)
*G06F 15/16*    (2006.01)
(52) U.S. Cl. .......................... 455/418; 705/1.1; 709/228
(58) Field of Classification Search .................. 455/418; 709/228, 217; 705/1, 10
See application file for complete search history.

(56) References Cited

U.S. PATENT DOCUMENTS

| 6,470,447 | B1 | 10/2002 | Lambert et al. | |
| 6,771,955 | B2 | 8/2004 | Imura et al. | |
| 2001/0016491 | A1 | 8/2001 | Imura et al. | |
| 2004/0199398 | A1* | 10/2004 | Kubota | 705/1 |
| 2004/0205194 | A1* | 10/2004 | Sahai | 709/228 |
| 2004/0260784 | A1* | 12/2004 | Lee et al. | 709/217 |

FOREIGN PATENT DOCUMENTS

| EP | 1 115 260 A2 | 7/2001 |
| GB | 2348568 A | 10/2000 |
| JP | 2001-197194 | 7/2001 |
| JP | 2002-540748 | 11/2002 |
| JP | 2004-86441 | 3/2004 |
| JP | 2004-328560 | 11/2004 |
| JP | 2004-357229 | 12/2004 |
| WO | WO 00/59253 A1 | 10/2000 |

* cited by examiner

*Primary Examiner* — Charles N Appiah
*Assistant Examiner* — Kiet Doan
(74) *Attorney, Agent, or Firm* — Kratz, Quintos & Hanson, LLP

(57) ABSTRACT

A wireless communication processing decision unit 33 acquires, from a wireless communication specific information storage unit 52, wireless communication specific information which specifies regions in which utilization of its frequency bandwidth is permitted by law. Next, registered position information which specifies the region in which this mobile communication terminal is position registered is acquired from a registered position information storage unit 34. Next, if the region specified by the registered position information is included in the regions shown by the wireless communication specific information, then the wireless communication processing decision unit 33 makes a decision to the effect that communication is possible, and notifies a communication processing unit 53 of this permission of communication. Upon receipt of this communication permission, the communication processing unit 53 starts communication processing.

10 Claims, 9 Drawing Sheets

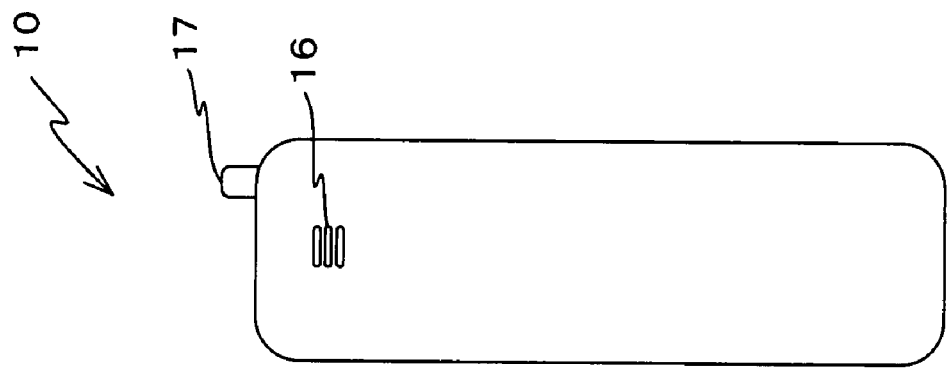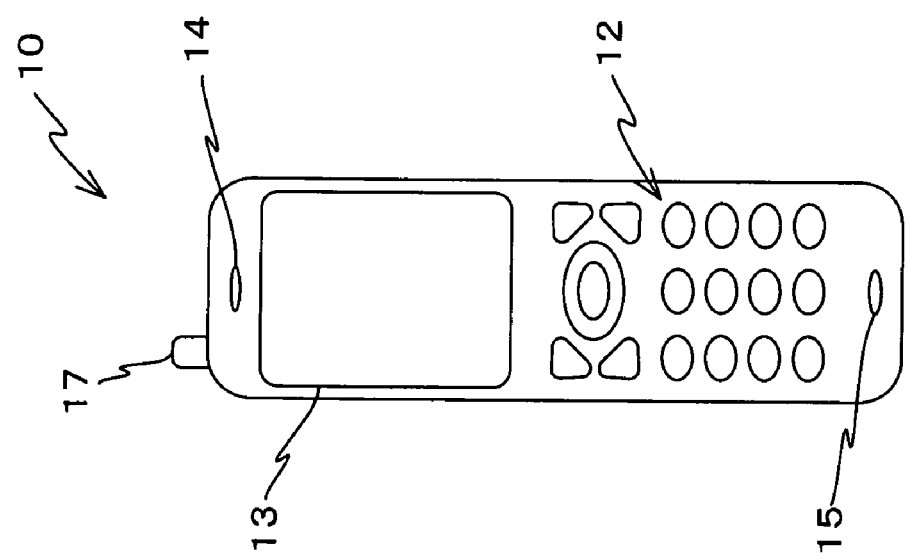

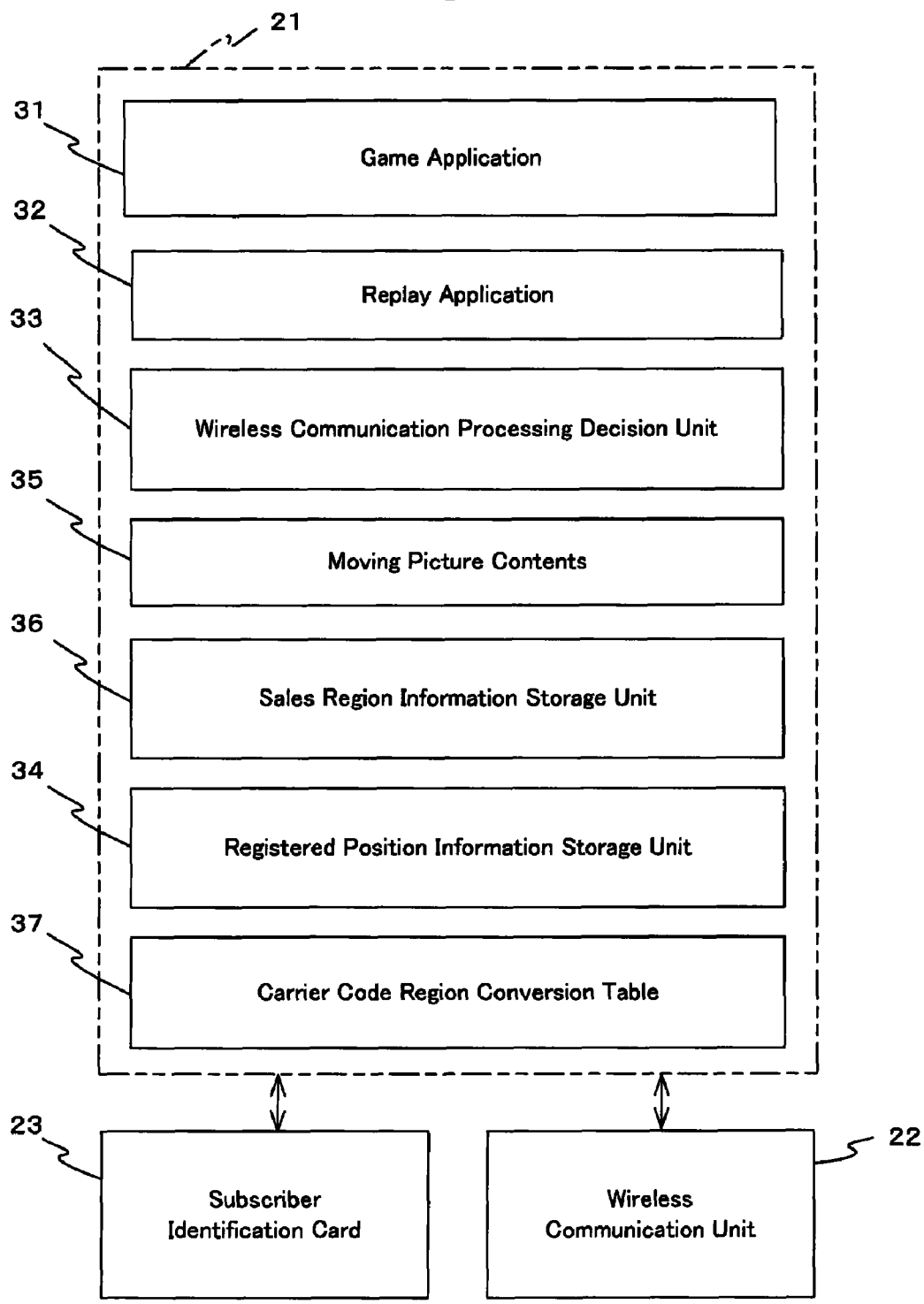

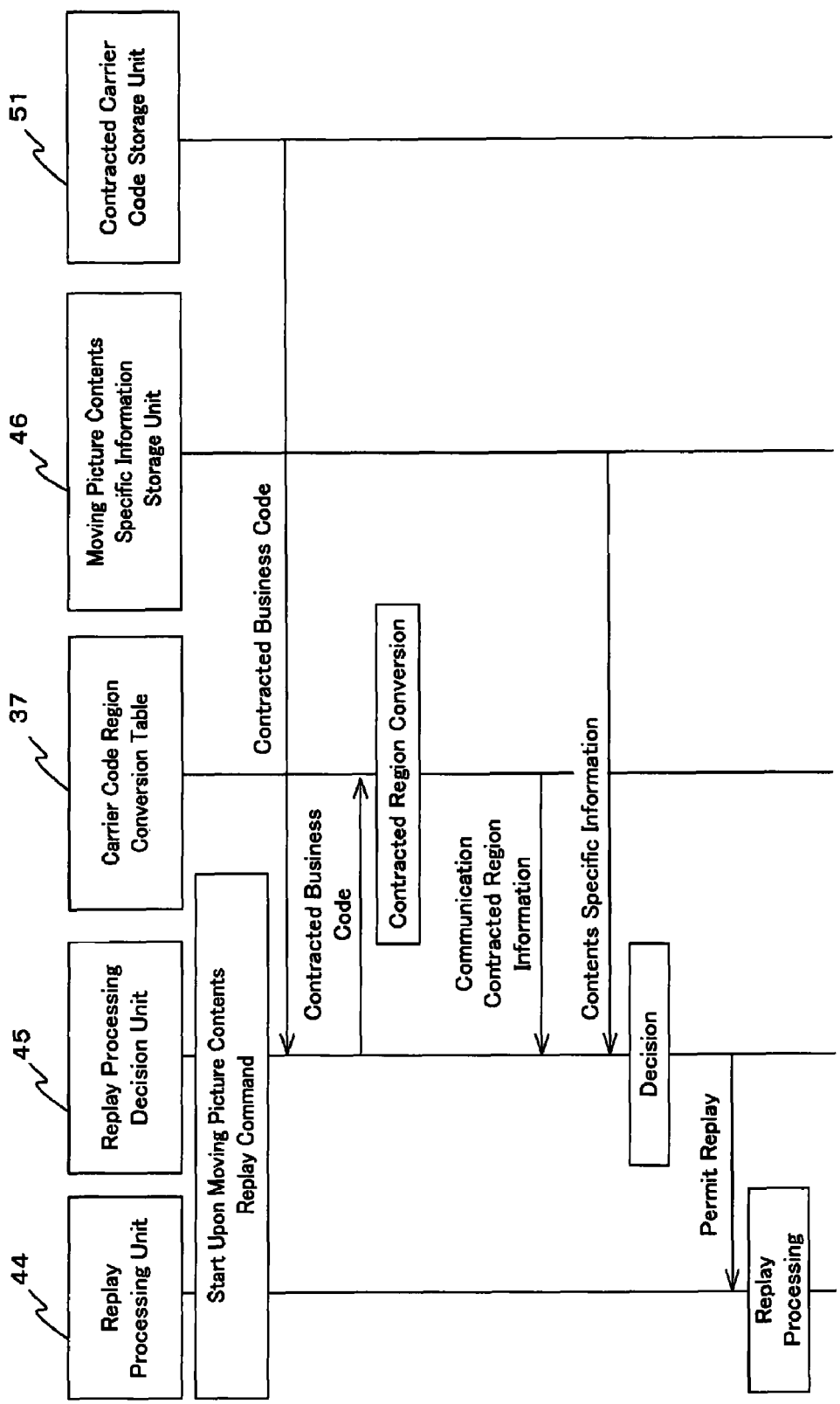

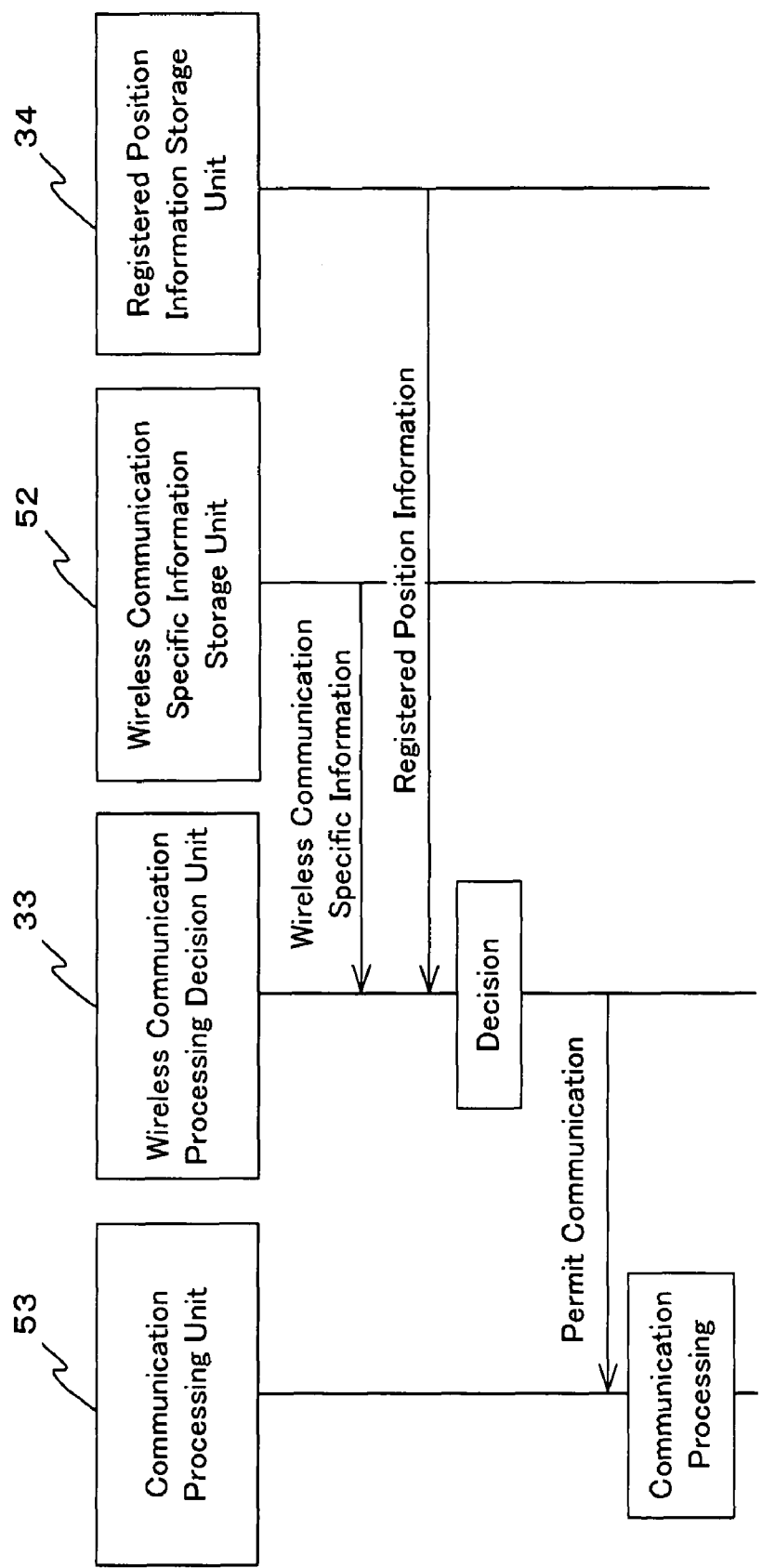

PROCESSING DECISION METHOD AND MOBILE COMMUNICATION TERMINAL

RELATED APPLICATION

This is a continuation application of the international patent application No. PCT/JP2006/304712 filed with application date: Mar. 10, 2006. The present application is based on, and claims priority from, J.P. Application 2005-068744, filed on Mar. 11, 2005, the disclosure of which is hereby incorporated by reference herein its entirety.

BACKGROUND OF THE INVENTION

The present invention relates to a processing decision method and to a mobile communication terminal, and, more particularly, relates to a processing decision method for deciding whether or not to perform a predetermined process, and to a mobile communication terminal which employs that method.

BACKGROUND ART

From the past, mobile communication terminal such as cellular phones have become widespread. In recent years, not only have telephone processing and email processing been available with mobile communication terminal, but also some devices have emerged which are equipped with game execution processing and replay processing for various types of content, such as moving picture. Furthermore, with regard to communication processing, cellular phones have also emerged which can be utilized without modification, not only in-country, but also overseas.

SUMMARY OF THE INVENTION

As described above, due to increase in the number of functions and globalization, mobile communication terminal have become able to execute various kinds of processing in various different regions. In this type of situation, even if the same processing is executed, depending upon the region in which a mobile communication terminal is utilized, sometimes it may happen that various rights which are included in this processing or in the contents which are subjected to this processing, such as patent rights and copyrights, may be infringed, which is very undesirable.

Furthermore, depending upon the region, sometimes it may also be the case that, due to regulations or differences in popular morals, it is not acceptable for the mobile communication terminal to perform some specific processing. Moreover, it is also often the case that, due to his strategic business objectives, there may be regions in which a service supplier or a product dealer does not wish predetermined processing to be executed by, or contents supplied upon, the mobile communication terminal.

The present invention has been conceived in consideration of the circumstances described above, and it takes as its object to provide a processing decision method and a mobile communication terminal, which can decide whether or not to perform various types of processing within the mobile telephone device, from the point of view of aspects other than technical ones, such as rights, regulations, and business strategy.

The processing decision method of the present invention is a processing decision method for a mobile communication terminal, for deciding whether or not it is possible to perform predetermined processing, comprising: a processing specific region information acquisition step which acquires processing specific region information, which is information stored within said mobile communication terminal and specifying a specific region which has been decided upon as corresponding to said predetermined processing, for deciding whether or not it is possible to perform said predetermined processing; a processing independent region information acquisition step which acquires processing independent region information, which is region information stored within said mobile communication terminal, and which is determined independently from said predetermined processing; and a processing decision step, which compares together said processing specific region information and said processing independent region information, acquired by said processing specific region information acquisition step and said processing independent region information acquisition step, and decides whether or not it is possible to perform said predetermined processing.

In this processing decision method, first, in the processing specific region information acquisition step, processing specific region information, which is information stored within said mobile communication terminal and specifying a specific region which has been decided upon as corresponding to the predetermined processing, is acquired. In this case, "information specifying a specific region which has been decided upon as corresponding to the predetermined processing" is information for deciding whether or not it is possible to perform said predetermined processing; in concrete terms, this means information specifying a region or regions in which it is possible to perform the predetermined processing, or a region or regions in which it is not possible to perform the predetermined processing.

Furthermore, "stored within said mobile communication terminal" not only means that this information is actually stored, but also is to be taken as including the meaning that this information may be deduced from the information which is actually stored. Accordingly, information which is obtained from identifier information which is stored within the device by using, for example, a conversion table stored in the device, is to be considered as constituting information which is stored within the device.

Next, in the processing independent region information acquisition step, processing independent region information, which is region information stored within said mobile communication terminal, and which is determined independently from said predetermined processing, is acquired. In this case, "region information which is determined independently from said predetermined processing" is region information which is determined as having no direct relationship with this predetermined processing; if, for example, the predetermined processing is processing of a game, then it is information which has no direct relationship with this game processing, such as information about the region in which this mobile communication terminal was purchased or the like. Furthermore, "stored within said mobile communication terminal" is used to mean the same as described above.

Finally, in the processing decision step, said processing specific region information and said processing independent region information which have been acquired are compared together, and a decision is made as to whether or not it is possible to perform said predetermined processing. Thus, according to this processing decision method, it is possible to decide whether or not to perform various types of processing within the mobile communication terminal, from the point of view of aspects other than technical ones, such as rights, regulations, and business strategy.

With the processing decision method of the present invention, the processing independent region information may be taken as being information which specifies the region in which the user of said mobile communication terminal has concluded a communication contract. In this case, "the region in which the user of said mobile communication terminal has concluded a communication contract" means, for example, the region of the address of the telecommunications carrier with which the user is contracted, which is stored in a SIM (Subscriber Identity Module) or a UIM (User Identity Module) which is inserted into the mobile communication terminal. In this case, in making this decision as to whether or not to perform the predetermined processing, the mobile communication terminal is able to refer to this information about the region in which the user has concluded his communication contract.

Furthermore, with the processing decision method of the present invention, the processing independent region information may be taken as being information which specifies the region in which said mobile communication terminal was purchased. In this case, the "information specifying the purchase region" can be read out from the information stored in a ROM (Read Only Memory) or the like, within the mobile communication terminal. In this case, in making this decision as to whether or not to perform the predetermined processing, the mobile communication terminal is able to refer to this information about the region in which this mobile communication terminal was bought.

Moreover, with the processing decision method of the present invention, the processing independent region information may be taken as being information which specifies the region in which said mobile communication terminal is position registered. In this case, "position registered" means that, in wireless communication performed by the mobile communication terminal, the area in which the mobile communication terminal is present is registered in the network equipment provided by the telecommunications carrier. Furthermore, "the region which is position registered" means that area, and, since this information is also stored upon the mobile communication terminal, it can also be utilized by the mobile communication terminal. In this case, in making the decision as to whether or not to perform the predetermined processing, the mobile communication terminal is able to refer to this information about the region in which the mobile communication terminal is position registered.

Yet further, with the processing decision method of the present invention, the processing specific region information may be taken as being determined according to the presence or absence of a right to perform said predetermined processing in the region specified by said processing specific region information. In this case, "the presence or absence of a right to perform said predetermined processing in the region" refers to a case in which the region in which it is possible to perform this predetermined processing is limited by, for example, the presence or absence of copyright or patent rights, or by contract. In this case, the mobile communication terminal is able to decide whether or not to perform the predetermined processing, according to the presence or absence of the right to perform that processing.

Still further, with the processing decision method of the present invention, the processing specific region information may be taken as being determined according to whether or not performing said predetermined processing conforms to law, regulation, or custom in the region specified by said processing specific region information. In this case, the case in which it "does not conform to law, regulation, or custom in the region" means, for example, a case in which, in this region, performing this predetermined processing is forbidden by law, or contravenes public order and morals, or is not religiously permitted. In this case, the mobile communication terminal is able to decide whether or not to perform the predetermined processing, according to whether or not doing so conforms to law, regulation, and custom.

Even further, with the processing decision method of the present invention, the predetermined processing may be taken as being the execution of an application program mounted said mobile communication terminal. In this case, it is possible to decide whether or not each of these application programs should be executed.

Still yet further, with the processing decision method of the present invention, the predetermined processing may be taken as being the display or replay of contents stored in said mobile communication terminal. In this case, the term "contents" means, for example, audio, still picture, moving picture, a document or the like, i.e. so called multimedia contents. In this case, it is possible to decide whether or not display processing or replay processing of each of these contents should be performed.

Moreover, with the processing decision method of the present invention, the predetermined processing may be taken as being processing which is performed by a device within said mobile communication terminal. In this case, it is possible to decide whether or not processing which is performed by this device should be performed.

The mobile communication terminal of the present invention is a mobile communication terminal, comprising: a processing specific region information storage means which stores processing specific region information, which is information specifying a specific region which has been decided upon as corresponding to said predetermined processing, for deciding whether or not it is possible to perform said predetermined processing; a processing independent region information storage means which stores processing independent region information, which is region information determined independently from said predetermined processing; and a processing decision means which compares together said processing specific region information and said processing independent region information, and decides whether or not it is possible to perform said predetermined processing.

With this mobile communication terminal, the processing specific region information storage means stores the processing specific region information, which is information specifying a specific region which has been decided upon as corresponding to said predetermined processing, for deciding whether or not it is possible to perform said predetermined processing; and moreover the processing independent region information storage means stores the processing independent region information, which is region information determined independently from the predetermined processing. In this case, "information specifying a specific region which has been decided upon as corresponding to said predetermined processing" and "region information determined independently from the predetermined processing" mean the same as in the case of the processing decision method, described previously.

And furthermore, the processing decision means compares together said processing specific region information and said processing independent region information, and decides whether or not it is possible to perform said predetermined processing. Thus, with this mobile communication terminal, it is possible to decide whether or not to perform various types of processing within the mobile telephone device, from the point of view of aspects other than technical ones, such as rights, regulations, and business strategy.

As has been explained above, according to the processing decision method of the present invention and the mobile communication terminal to which this processing decision method is applied, the beneficial effect is obtained that it is possible to decide whether or not to perform various types of processing within the mobile communication terminal, from the point of view of aspects other than technical ones, such as rights, regulations, and business strategy.

BRIEF DESCRIPTION OF DRAWINGS

FIG. 1A is an elevation view schematically showing a cellular phone 10 which is an embodiment of the present invention;

FIG. 1B is a rear view schematically showing this cellular phone 10 which is an embodiment of the present invention;

FIG. 3A is a figure showing the functional structure of the internal system 11 of FIG. 2;

FIG. 5 is a sequence figure for explanation of replay starting processing of the moving picture contents 35 of FIG. 3; and FIG. 6 is a sequence figure for explanation of wireless communication starting processing by the wireless communication unit 22 of FIG. 3.

DETAILED DESCRIPTION

Figure 2:
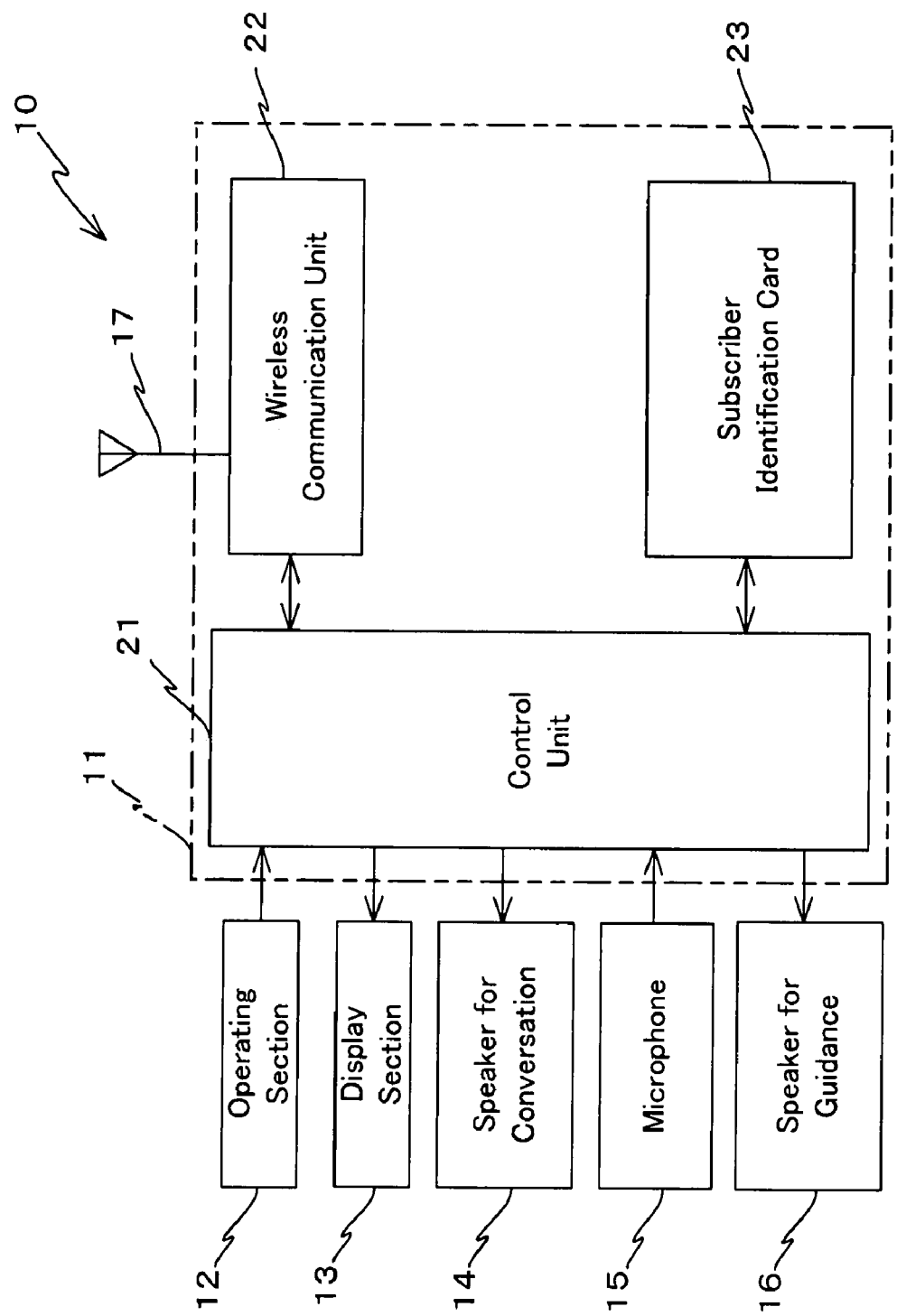
FIG. 2 is a figure showing the structure of an internal system 11 of the cellular phone 10 of FIGS. 1A and 1B.

In the following, an embodiment of the present invention will be explained with reference to FIGS. 1A through 6. It should be understood that, in these figures, to elements which are the same or equivalent, the same reference symbols are appended, and overlapped explanation is omitted.

In FIGS. 1A and 1B, the external appearance of a cellular phone 10 is schematically shown. As shown in FIGS. 1A and 1B, this cellular phone 10 comprises: (a) an operation section 12 which comprises a numeral key pad for inputting telephone numbers and function keys for inputting various types of command, such as changeover of the operating mode and the like; (b) a display section 13 which comprises a liquid crystal display device which displays guidance for operating the cellular phone 10, its operational state, received messages, and the like; (c) a speaker for conversation 14 which replays voice signals which have arrived from another party during conversation; (d) a microphone 15 for inputting sound during sound gathering, and for inputting voice during a conversation; (e) a speaker for guidance 16 for generating ring tones and guidance sounds; and (f) an antenna 17 for performing wireless communication with a base station.

In FIG. 2 there is schematically shown an internal system 11, which is an information processing system internal to the cellular phone 10. This internal system 11 comprises: a control unit 21 which controls the overall system of the cellular phone 10 as a whole; a wireless communication unit 22 which performs communication with a base station via the antenna 17; and a subscriber identification card 23 issued by a telecommunications carrier to which the user of this cellular phone 10 has subscribed.

In this embodiment, the control unit 21 comprises a central processing unit (CPU), a digital signal processor (DSP), a ROM (Read Only Memory), a RAM (Random Access Memory), and the like, none of which are shown in the figures.

In FIGS. 3A through 3F, the functional structure of the control unit 21, the wireless communication unit 22 and the subscriber identification card 23 are schematically shown. The control unit 21 comprises: (a) a game application 31, which is an application for executing a game; (b) a replay application 32 which replays moving picture and music; (c) a wireless communication processing decision unit 33 which decides whether or not the frequency upon which the wireless communication unit 22 is attempting to perform wireless communication can be utilized; (d) a registered position information storage unit 34 in which is stored the identifier of the region which is currently position registered for the cellular phone 10 to perform wireless communication; (e) moving picture contents 35, replayed by the replay application 32; (f) a sales region information storage unit 36 in which is stored the identifier of the region in which this cellular phone 10 was sold; and (g) a carrier code region conversion table 37, which is a table for converting from a code for identifying a telecommunications carrier to an identifier of the region to which that telecommunications carrier belongs.

Figure 3B:
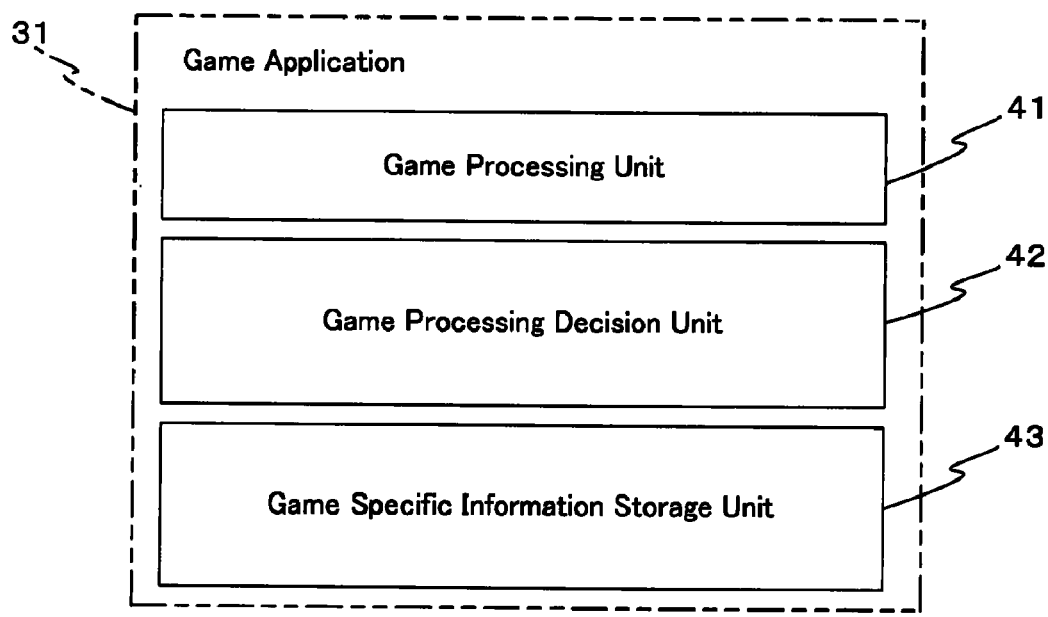
FIG. 3B is a figure showing the structure of a game application 31 of FIG. 3A.

Furthermore, as shown in FIG. 3B, the game application 31 comprises a game processing unit 41 which performs processing for the game itself, a game processing decision unit 42 which decides whether or not processing of the game should be performed, and a game specific information storage unit 43, in which is stored the identifiers of the sales regions of the cellular phone in which processing of the game may be performed. In concrete terms, as these region identifiers which are stored in this game specific information storage unit 43, there are stored the identifiers of the regions for which a software license fee for the game application 31 has been paid.

Figure 3C:
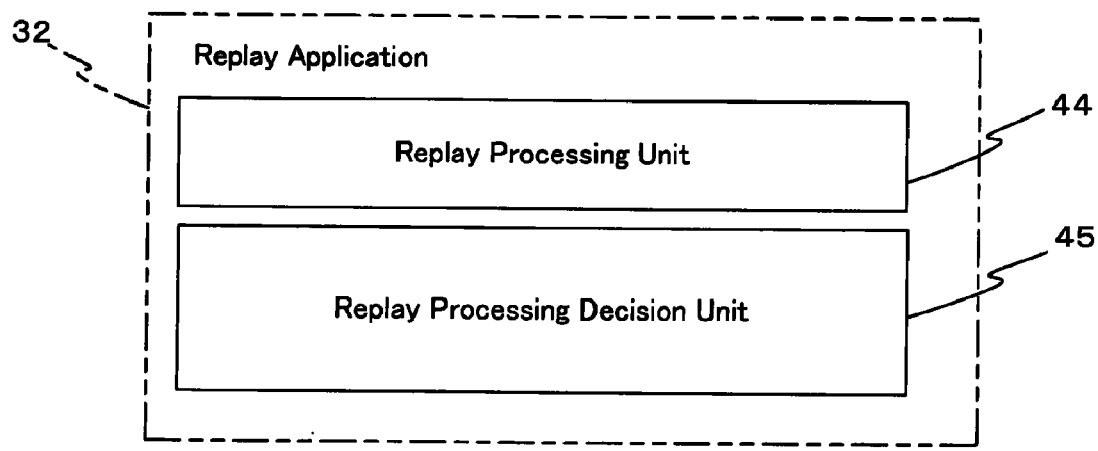
FIG. 3C is a figure showing the structure of a replay application 32 of FIG. 3A.

Furthermore, as shown in FIG. 3C, the replay application 32 comprises a replay processing unit 44 which performs replay of moving picture contents, and a replay processing decision unit 45 which decides, for each moving picture contents, whether or not replay of this moving picture contents should be performed.

Figure 3D:
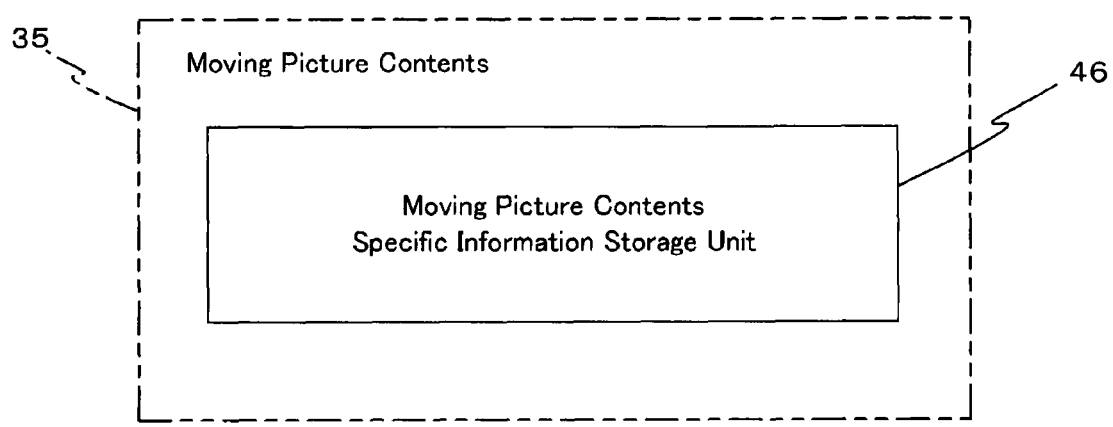
FIG. 3D is a figure showing the structure of a moving image contents 35 of FIG. 3A.

Yet further, as shown in FIG. 3D, the moving picture contents 35 comprises a moving picture contents specific information storage unit 46 in which there is stored the identifier of the region to which the contracted telecommunications carrier belongs, and in which it is possible to replay this moving picture contents 35. In this embodiment, "the region to which the contracted telecommunications carrier belongs" means the region which is the location of the telecommunications carrier with which the user of the cellular phone has directly contracted, and does not include the region to which a telecommunications carrier which is utilized during roaming belongs, or the like.

Figure 3E:
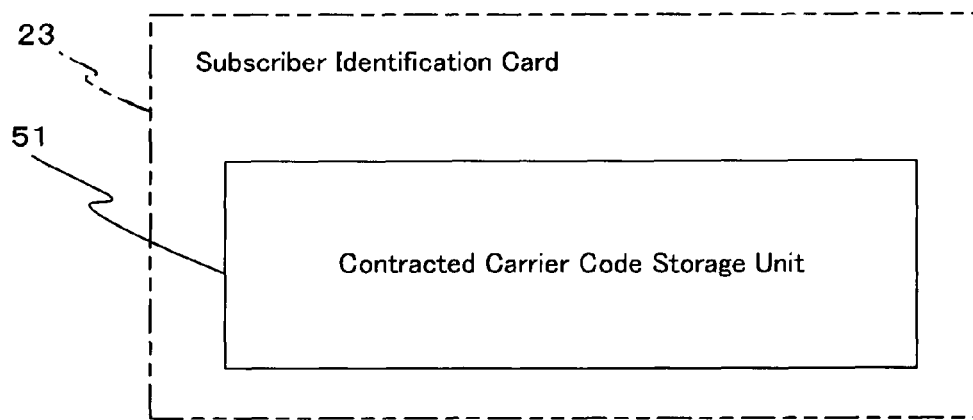
FIG. 3E is a figure showing the structure of a subscriber identification card 23 of FIG. 3A.
Figure 3F:
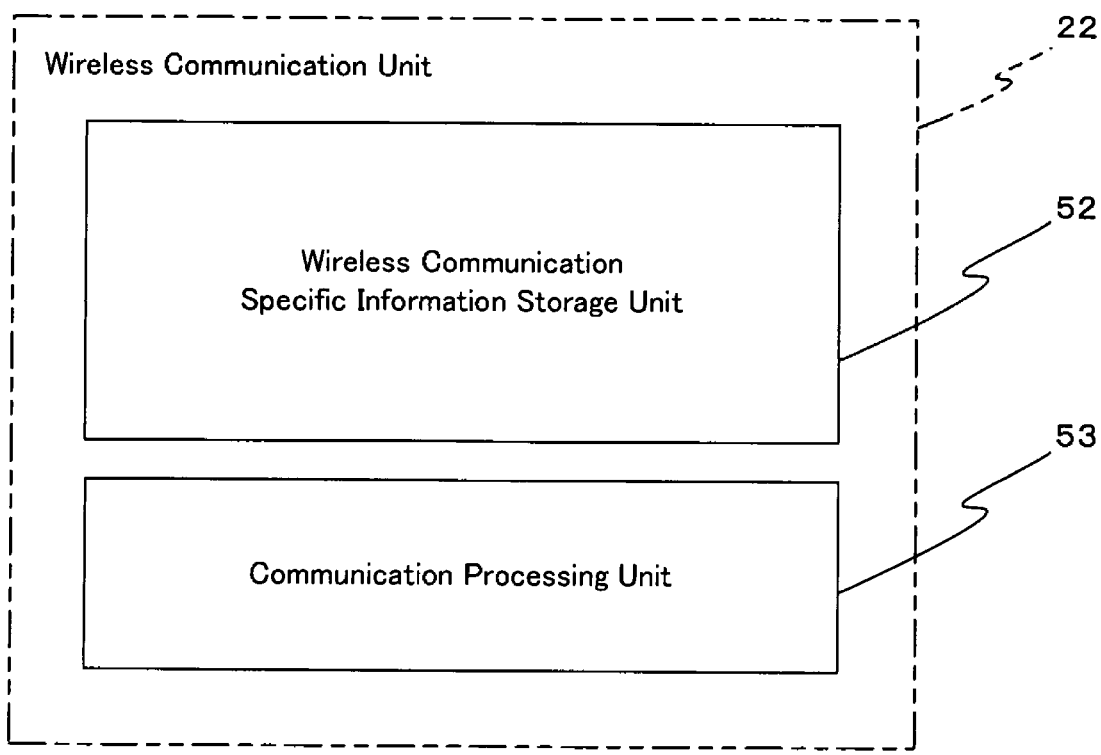
FIG. 3F is a figure showing the structure of a wireless communication unit 22 of FIG. 3A.

Furthermore, as shown in FIG. 3E, the subscriber identification card 23 comprises a contracted carrier code storage unit 51, in which is stored a code for identifying the telecommunications carrier with which the user of this cellular phone 10 is contracted. Moreover, as shown in FIG. 3F, the wireless communication unit 22 comprises a wireless communication specific information storage unit 52 in which is stored, for each frequency radio wave bandwidth upon which the wireless communication unit 22 is capable of communicating, identifiers of the regions in which it is legally permitted to utilize this frequency bandwidth, and a communication processing unit 53 which performs processing for wireless communication via the antenna 17.

Thus, if the identifier of the sales region of the cellular phone 10 which is stored in the sales region information storage unit 36 is included in the identifiers of regions which are stored in the game specific information storage unit 43, then the game processing decision unit 42 is enabled to make a decision to the effect that it can perform processing of the game, since the user possesses the right to utilize the software of the game.

Moreover, during replay of the moving picture contents 35, using the carrier code region conversion table 37, the replay processing decision unit 45 converts the code for identifying the telecommunications carrier with which the user is contracted, stored in the contracted carrier code storage unit 51, to the identifier of the region to which this telecommunications carrier belongs. And it is arranged, if this region identifier is included in the identifiers of regions which are stored in the replay moving picture contents specific information storage unit 46, to make a decision to the effect that replay may be performed, since the region to which the contracted telecommunications carrier of this user belongs is one in which it is possible to replay the moving picture contents 35.

Yet further, if the identifier of the registered position region which is stored in the registered position information storage unit 34 is included in the identifiers of the regions stored in the wireless communication specific information storage unit 52, then the wireless communication processing decision unit 33 is able to make a decision to the effect that it is possible to perform wireless communication upon this bandwidth, since this is a region in which the use of this frequency bandwidth for attempting to perform communication is permitted by law.

Next, the processing decision method for the cellular phone 10 having the structure described above will be explained with reference to FIGS. 4 through 6.

Figure 4:
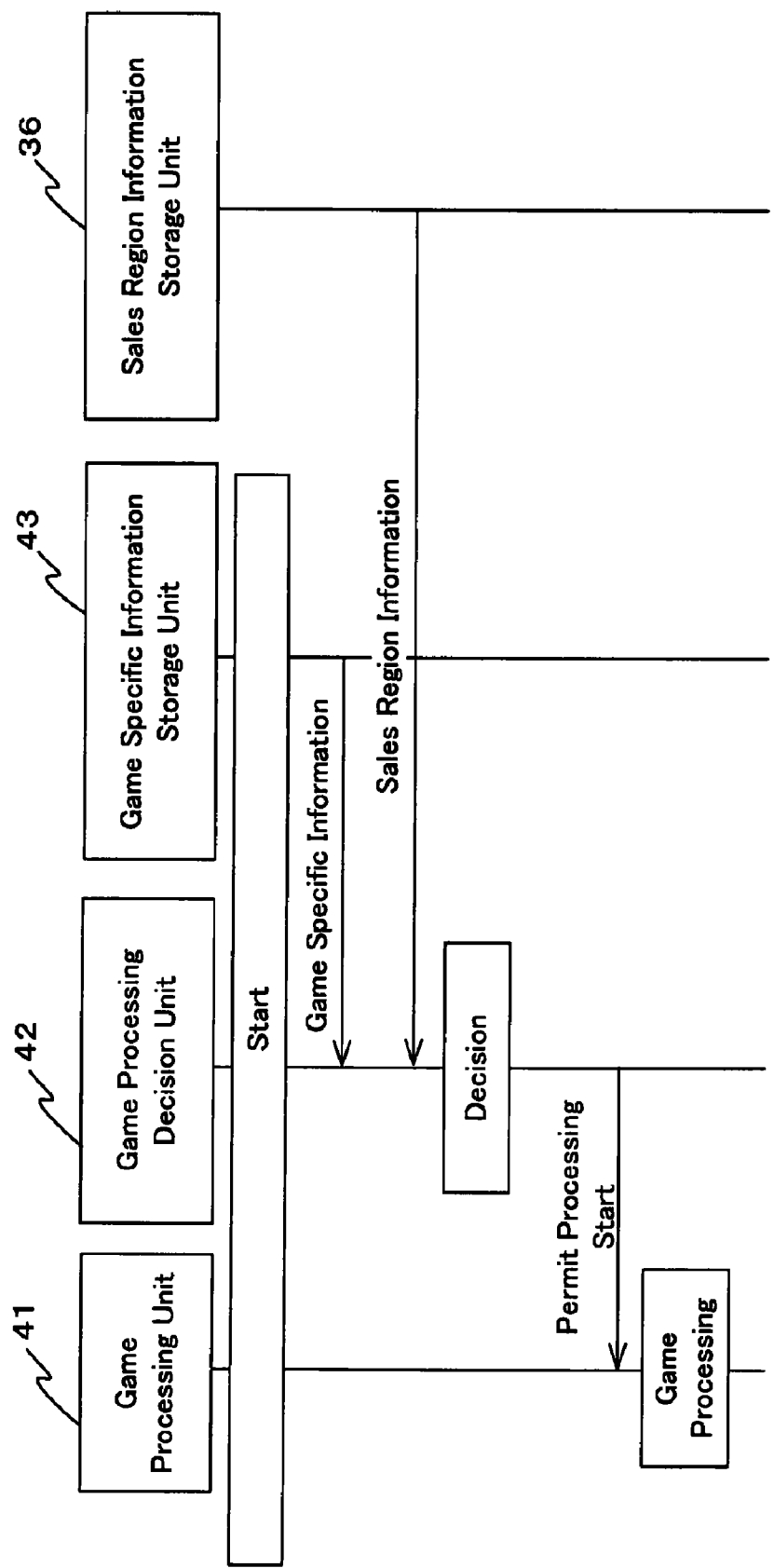
FIG. 4 is a sequence figure for explanation of game starting processing of the game application 31 of FIG. 3.

In FIG. 4, there is shown the processing situation when starting the game application 31 upon the cellular phone 10. As shown in this figure, when starting the game application 31, the game processing decision unit 42 acquires the identifiers of the sales regions in which it is possible to perform the game (i.e. the game specific information) from the game specific information storage unit 43, and next acquires the identifier of the sales region (i.e. the sales region information) of the cellular phone 10 from the sales region information storage unit 36.

Next, if the identifier of the sales region of the cellular phone 10 is included in the identifiers which have thus been acquired of the sales regions in which it is possible to play the game, then the game processing decision unit 42 makes a decision to the effect that processing of the game should be performed, and notifies the game processing unit 41 that the start of processing is permitted. Upon this notification that the start of processing is permitted, the game processing unit 41 starts processing of the game. On the other hand, if the identifier of the sales region of the cellular phone 10 is not included in the identifiers which have thus been acquired of the sales regions in which it is possible to play the game, then the game processing decision unit 42 makes a decision to the effect that processing of the game should not be performed, and displays upon the display section 13 a message to the effect that it is not possible to utilize the game application 31.

In FIG. 5, there is shown the processing situation when replaying the moving picture contents 35 upon the cellular phone 10. First, when a command is issued to replay the moving picture contents 35, the replay application 32 is started. Subsequently, the replay processing decision unit 45 acquires, from the contracted carrier code storage unit 51, the contracted business code for identifying the communication business with which the user is contracted. Next, using the carrier code region conversion table 37, the replay processing decision unit 45 acquires the identifier of the region to which the business to which this code is allocated belongs. In other words, it acquires the identifier of the region to which the telecommunications carrier with which the user is contracted belongs (i.e. the communication contract region information). Furthermore, the replay processing decision unit 45 acquires, from the moving picture contents specific information storage unit 46, the identifiers of the regions to which a telecommunications carrier belongs, in which it is possible to replay the moving picture contents 35 (the contents specific information).

If the communication contract region information is included in the contents specific information, then the replay processing decision unit 45 makes a decision to the effect that replay of the moving picture contents 35 is to be performed, and notifies this replay permission to the replay processing unit 44. The replay processing unit 44, which has thus been permitted to perform replaying, replays the moving picture contents 35. On the other hand, if the communication contract region information is not included in the contents specific information, then a decision is taken to the effect that replay of the moving picture contents 35 should not be performed, and a message is displayed upon the display section 13 to the effect that it is not possible to replay the moving picture contents 35.

In FIG. 6, there is shown the processing situation when performing wireless communication upon the cellular phone 10. When a command has been issued to the wireless communication unit 22 to perform communication processing upon some frequency, then, first, the wireless communication processing decision unit 33 acquires, from the wireless communication specific information storage unit 52, the identifiers of the regions in which the use of this frequency bandwidth is permitted by law (i.e. wireless communication specific information). Next, it acquires from the registered position information storage unit 34, the identifier of the region in which this cellular phone 10 is position registered (i.e. the registered position information).

Next, if the registered position information is included in the wireless communication specific information which have thus been acquired, then the wireless communication processing decision unit 33 makes a decision to the effect that communication may be performed, and notifies the communication processing unit 53 of this permission of communication. And, upon receipt of this notification of communication permission, the communication processing unit 53 starts communication processing. On the other hand, if the registered position information is not included in the wireless communication specific information, then a decision is taken to the effect that communication should not be performed, and a message is displayed upon the display section 13 to the effect that communication cannot be performed.

As has been explained above, in this embodiment, if the identifier of the sales region of the cellular phone 10 is included in the identifiers of the sales regions in which it is possible to perform the game which has been stored as the game application 31, then the game processing decision unit 42 makes the decision to perform processing of the game, and the game processing unit 41 starts processing the game. In other words, the cellular phone 10 is able to use the game application 31 in the regions, in which the price includes the license fee for the software of the game application 31; while the game application 31 cannot be used in sales regions, in which the price doesn't include the software license fee for the game application 31.

Moreover, if the communication contract region information is included in the contents specific information, then the replay processing decision unit 45 takes a decision to the effect that the moving picture contents 35 should be replayed, and the replay processing unit 44 replays the moving picture contents 35. In other words, a user who is contracted with a telecommunications carrier which belongs to some region is able to replay the moving picture contents 35; while a user who is contracted with a telecommunications carrier which belongs to some other region is not able to replay the moving picture contents 35.

Furthermore, if the registered position information is included in the wireless communication specific information, then the wireless communication processing decision unit 33 makes a decision to the effect that communication should be performed, and the communication processing unit 53 starts the communication. In other words, if the frequency upon which a communication attempt is being made is legally permitted in the region in which the cellular phone 10 is position registered, i.e. in the region which the user of the cellular phone 10 is present, then it is possible to utilize this frequency; while, if this frequency is not legally permitted, then communication upon this frequency is not possible.

Accordingly, in this embodiment, by storing within the cellular phone, in relation with various types of processing, the regions for which rights are possessed, the regions which are regulated by law and so on, and information about the regions in which services are implemented, it is possible to decide whether or not to perform processing, by comparison of these items of information with information specifying the sales region of the cellular phone, its registered position region, and its contract region, respectively.

In other words, in this embodiment, it is possible to decide whether or not to perform various types of processing within the mobile communication terminal, according to considerations other than technical aspects, such as rights, regulations, and business strategy.

Note that it should be understood that, in this embodiment, it is arranged for the game processing decision unit 42 and the replay processing decision unit 45 to be included in, respectively, the game application 31 and the replay application 32. By contrast, it would also be acceptable for these decision units 42 and 45 to be functions included in the control unit 21 which is separate from these applications, or they could also be functions other than ones of the control unit 21.

Furthermore although, in this embodiment, it was arranged for the wireless communication processing decision unit 33 to be included in the control unit 21, it would also be acceptable to arrange for it to be included in the wireless communication unit 22.

Furthermore although, in this embodiment, the regions are supposed to be simply regions, it would also be acceptable for the regions to be countries; and it would also be acceptable for them to be districts which are included in a country.

Furthermore, in this embodiment, the processing specific region information is supposed to be game specific information, wireless communication specific information, and moving picture contents specific information, and the processing independent region information for this processing specific region information is supposed to be, respectively, sales region information, registered position information, and communication contract region information; and the decision to perform processing is made upon the identifiers of the processing region independent information being included in the identifiers of the specific processing regions information. By contrast, it would also be acceptable to arrange to decide not to perform processing upon the identifiers of the processing independent region information being included in the identifiers of the processing specific region information, or to arrange to make this decision by performing processing using some other reference for comparison.

Furthermore, in this embodiment, it is arranged for the game specific information storage unit 43 to store the identifier of the sales region of the cellular phone, in which it is possible to perform processing of the game, and for the game processing decision unit 42 to make its decision using this identifier of the sales region. By contrast, it would also be acceptable to arrange to make this decision using some other type of region, such as the region which is position registered, or the region to which the contracted telecommunications carrier belongs, or the like.

Furthermore, in this embodiment, it is arranged for the identifier of the region to which the contracted telecommunications carrier belongs to be stored in the moving picture contents specific information storage unit 46, and for the replay processing decision unit 45 to make its decision using this identifier of the region to which the contracted telecommunications carrier. By contrast, it would also be acceptable to arrange for the replay processing decision unit 45 to make this decision using another type of region, such as the region which is position registered, or the sales region of the cellular phone, or the like.

Furthermore, in this embodiment, it is arranged for the identifiers of the regions in which the use of a frequency bandwidth is permitted to be stored in the wireless communication specific information storage unit 52, and for the wireless communication processing decision unit 33 to make its decision using the identifier of the region which is position registered. By contrast, it would also be acceptable to arrange for the wireless communication processing decision unit 33 to make this decision using the identifier of some other type of region, such as the region to which the contracted telecommunications carrier belongs, or the sales region of the cellular phone, or the like.

Furthermore, in this embodiment, it is arranged to perform decisions in relation to processing of the game, wireless communication processing upon some frequency bandwidth, and replay processing of the contents. Of course it would also be possible to apply the present invention to other types of processing than these, such as, for example, processing related to the presence or absence of rights, and processing to which laws, regulations, and customs are applicable.

Furthermore, in this embodiment, it is arranged to convert the code for identifying the telecommunications carrier with which the user is contracted into the identifier of the region to which this telecommunications carrier belongs by using the carrier code region conversion table 37. By contrast, it would also be acceptable to arrange to convert it, not into the region to which the telecommunications carrier belongs, but rather, by using some other table, into the identifier of some other region, such as the service supply region or the like, and to arrange to use the identifier of this region as the identifier of the processing independent region information.

Furthermore although, in this embodiment, a cellular phone was employed as an example of a mobile communication terminal, it would also be acceptable for this mobile communication terminal to be some other type of mobile communication terminal.

As explained above, the processing decision method according to the present invention, and the mobile communication terminal which utilizes this method, can be applied to a mobile communication terminal.

What is claimed is:

1. A processing decision method for a mobile communication terminal, for deciding whether or not it is possible to perform predetermined processing, comprising:
   a processing specific region information acquisition step which acquires processing specific region information, which is information stored within said mobile communication terminal and specifying a specific region which has been decided upon as corresponding to said predetermined processing, for deciding whether or not it is possible to perform said predetermined processing;
   a processing independent region information acquisition step which acquires processing independent region information, which is region information stored within said mobile communication terminal, and which is determined independently from said predetermined processing; and
   a processing decision step, which compares together said processing specific region information and said processing independent region information, acquired by said processing specific region information acquisition step and said processing independent region information acquisition step, and decides whether or not it is possible to perform said predetermined processing.

2. A processing decision method as described in claim 1, characterized in that said processing independent region information is information which specifies the region in which the user of said mobile communication terminal has concluded a communication contract.

3. A processing decision method as described in claim 1, characterized in that said processing independent region information is information which specifies the region in which said mobile communication terminal was purchased.

4. A processing decision method as described in claim 1, characterized in that said processing independent region information is information which specifies the region in which said mobile communication terminal is position registered.

5. A processing decision method as described in claim 1, characterized in that said processing specific region information is determined according to the presence or absence of a right to perform said predetermined processing in the region specified by said processing specific region information.

6. A processing decision method as described in claim 1, characterized in that said processing specific region information is determined according to whether or not performing said predetermined processing in the region specified by said processing specific region information conforms to law, regulation, or custom.

7. A processing decision method as described in claim 1, characterized in that said predetermined processing is the execution of each application program mounted said mobile communication terminal.

8. A processing decision method as described in claim 1, characterized in that said predetermined processing is the display or replay of each contents stored on said mobile communication terminal.

9. A processing decision method as described in claim 1, characterized in that said predetermined processing is processing which is performed by a device within said mobile communication terminal.

10. A mobile communication terminal, comprising:
    a processing specific region information storage means which stores processing specific region information, which is information specifying a specific region which has been decided upon as corresponding to said predetermined processing, for deciding whether or not it is possible to perform said predetermined processing;
    a processing independent region information storage means which stores processing independent region information, which is region information determined independently from said predetermined processing; and
    a processing decision means which compares together said processing specific region information and said processing independent region information, and decides whether or not it is possible to perform said predetermined processing.

* * * * *